United States Patent
Ray (10) Patent No.: US 7,330,561 B2
(45) Date of Patent: Feb. 12, 2008

(54) OPTIMAL TEMPLATES FOR IMAGE DATA EMBEDDING

(75) Inventor: Lawrence A. Ray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 764 days.

(21) Appl. No.: 10/717,291

(22) Filed: Nov. 19, 2003

(65) Prior Publication Data

US 2005/0105762 A1 May 19, 2005

(51) Int. Cl.
*G06K 9/00* (2006.01)
(52) U.S. Cl. .................................... 382/100
(58) Field of Classification Search ............... 382/100, 382/209, 279, 232; 380/51, 54
See application file for complete search history.

(56) References Cited

U.S. PATENT DOCUMENTS

| | | | | |
|---|---|---|---|---|
| 5,721,788 | A * | 2/1998 | Powell et al. ................. | 382/100 |
| 5,850,481 | A * | 12/1998 | Rhoads ........................ | 382/232 |
| 6,044,156 | A | 3/2000 | Honsinger et al. | |
| 6,567,532 | B1 * | 5/2003 | Honsinger .................... | 382/100 |
| 6,678,390 | B1 * | 1/2004 | Honsinger .................... | 382/100 |
| 6,707,926 | B1 * | 3/2004 | Macy et al. .................. | 382/100 |
| 6,751,335 | B1 * | 6/2004 | Honsinger .................... | 382/100 |
| 6,754,365 | B1 * | 6/2004 | Wen et al. .................... | 382/100 |
| 6,925,192 | B2 * | 8/2005 | Honsinger et al. ........... | 382/100 |
| 6,983,059 | B2 * | 1/2006 | Muratani ...................... | 382/100 |
| 7,065,226 | B1 * | 6/2006 | Anzai et al. .................. | 382/100 |
| 7,130,442 | B2 * | 10/2006 | Braudaway et al. ......... | 382/100 |

OTHER PUBLICATIONS

Honsinger et al; "Data Embedding Using Phase Dispersion" http://www.kodak.com/US/plugins/acrobat/en/corp/researchDevelopment/dataEmbedding.pdf.*

* cited by examiner

*Primary Examiner*—Samir Ahmed
*Assistant Examiner*—Andrae Allison
(74) *Attorney, Agent, or Firm*—Peyton C. Watkins

(57) ABSTRACT

A method for creating a message template used for embedding hidden messages, the method includes the steps of determining a message template performance metric comprising a dispersal measure having both a spatial domain function and a frequency domain function; developing a numerical optimization algorithm containing the message template performance metric as a basis for optimization; determining the message template geometric configuration comprising: (i) determining a message template capacity; (ii) determining a message template area; and applying the numerical optimization algorithm to the message template geometric configuration which results in an optimal message template.

5 Claims, 5 Drawing Sheets

|0|1|0|0|0|
|0|0|0|-1|0|
|0|0|0|0|0|
|0|0|0|0|0|
|0|0|-1|0|0|
|0|0|0|0|0|

|0|1|0|0|0|0|1|0|0|0|
|0|0|0|-1|0|0|0|0|-1|0|
|0|0|0|0|0|0|0|0|0|0|
|0|0|0|0|0|0|0|0|0|0|
|0|0|-1|0|0|0|0|-1|0|0|
|0|0|0|0|0|0|0|0|0|0|

OPTIMAL TEMPLATES FOR IMAGE DATA EMBEDDING

FIELD OF THE INVENTION

The invention relates generally to the field of digital image processing, and in particular to embedding and extracting hidden messages in digital image data. This field is also referred to as data hiding, information hiding, watermarking and also steganography.

BACKGROUND OF THE INVENTION

A technique for embedding messages in digital image data is disclosed by Honsinger, et. al., (see "Method for Generating an Improved Carrier for use in an Image Data Embedding Application," U.S. Pat. No. 6,044,156 issued Mar. 28, 2000). This method for embedding a hidden message includes the steps of forming a digitize version of the desired message; generating a random phase carrier; convolving the digitized version of the desired message and the random phase carrier to form a dispersed message; and combining the dispersed message with the digitized image to form an embedded hidden message image. Hidden messages may be embedded in photographic images recorded on film and paper using conventional photographic printing techniques, or they may be embedded in images produced on printers such as ink-jet and thermal dye transfer printers, by combining the dispersed image with a digital image processing techniques.

Hidden messages are recovered from the embedded hidden message image by cross correlating the embedded hidden message image containing the dispersed message with a decoding carrier to recover the embedded dispersed message; and extracting the digital image data for the recovered dispersed message.

One known techniques for extracting dispersed message when the image has been cropped and/or rotated employs a separate calibration signal contained in the image. Once the calibration signal was found, it is used to determine the dispersed message boundaries and the knowledge of the boundaries is used to extract the message from the image. Such a technique is described by Rhoads in U.S. Pat. No. 5,850,481, issued Dec. 15, 1998.

One problem with adding a calibration signal to an image is that it takes extra bandwidth that could be used for other purposes, such as storing more information in the hidden message. There is a need therefore for an improved method of identifying the dispersed message boundaries without the need for a separate calibration signal to aid in extraction of the dispersed message.

Honsinger, et. al., disclosed such a means (see U.S. patent application Ser. No. 09/453,160) to eliminate the requirement for a calibration signal. The method used by Honsinger is to build a message template used to indicate the location of the data in a message that is to be embedded in the image. The message template is represented as a rectangular array of pixel locations. Each pixel location of the template is either a one or a zero. If the pixel location contains a one, then the pixel location carries data for the hidden message. The message is encoded as a stream of binary bits, referred to as the original bit stream. The original bit stream, is first transformed to a stream of parity values, i.e., where the stream of bits are represented as +1 or −1, with the +1 representing a original bit value of 1 and a −1 representing an original bit value of 0. The pixel locations are then ordered in raster fashion to form a linear stream of data.

Consequently, there are two data streams, the template data stream and the transformed original bit stream. It is convenient to consider the two streams as lists and for each list to have a pointer, referred to as the template pointer and the hidden message pointer. Both pointers are initially at the first elements of their respective lists. A hidden message data stream is formed as follows. The element of the template data stream pointed to by the template pointer is either a one or a zero. If it is a one, then the element pointed to by the hidden message pointer is entered into the hidden message stream and the hidden message pointer is advanced to the next element of the transformed original message stream. Other wise a zero is entered into the hidden message stream. In either case, the template pointer is advanced to the next template element.

The message template can have many possible configurations depending upon the number of pixels in the template and the number of bits in the original bit stream. If the template is an n×n pixel array and the original bit stream has m bits, then there are $$\binom{n^2}{m}$$

possible configurations. It is not surprising that some configurations have better properties than others do. Consider the template array as torus, meaning that the top and bottom of the array and linked, as are the left and right sides of the array. Two desirable properties of the array are that the pixels with a one are isolated, and that a simple shift does not result in template pattern being replicated. The reason for the first property is to improve the resolution of the hidden message and the second is to assure the order of the hidden message is unambiguous.

Honsinger recognized that these are attractive properties and developed templates heuristically that had these characteristics. However, the method disclosed by Honsinger used a sequential means to attain the template and selected pixels based upon a predetermined template pattern, such as a spiral or a circle. Honsinger also mentions using a simulated annealing approach, but does not elaborate on the method. Two limitations arise from this approach, the first is number of potential templates considered is extremely restricted and the maximum number of bits permitted is determined arbitrarily.

Consequently, a need exists for overcoming the above-described drawbacks.

SUMMARY OF THE INVENTION

The present invention measures the performance of a hidden message template, determines the optimal template for a prescribed number of hidden message bits. Moreover, the number of hidden message bits can be increased until the performance of the optimal template does not meet the performance requirements. The result is a hidden message template that has maximum data capacity and meeting the prescribed performance requirements.

DETAILED DESCRIPTION OF THE INVENTION

In the following description, a preferred embodiment of the present invention will be described in terms that would ordinarily be implemented as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware and/or software for producing and otherwise processing the image signals involved therewith, not specifically shown or described herein, may be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably utilized on any well-known computer system, such as a personal computer. Consequently, the computer system will not be discussed in detail herein. It is also instructive to note that the images are either directly input into the computer system (for example by a digital camera) or digitized before input into the computer system (for example by scanning an original, such as a silver halide film).

Figure 1:
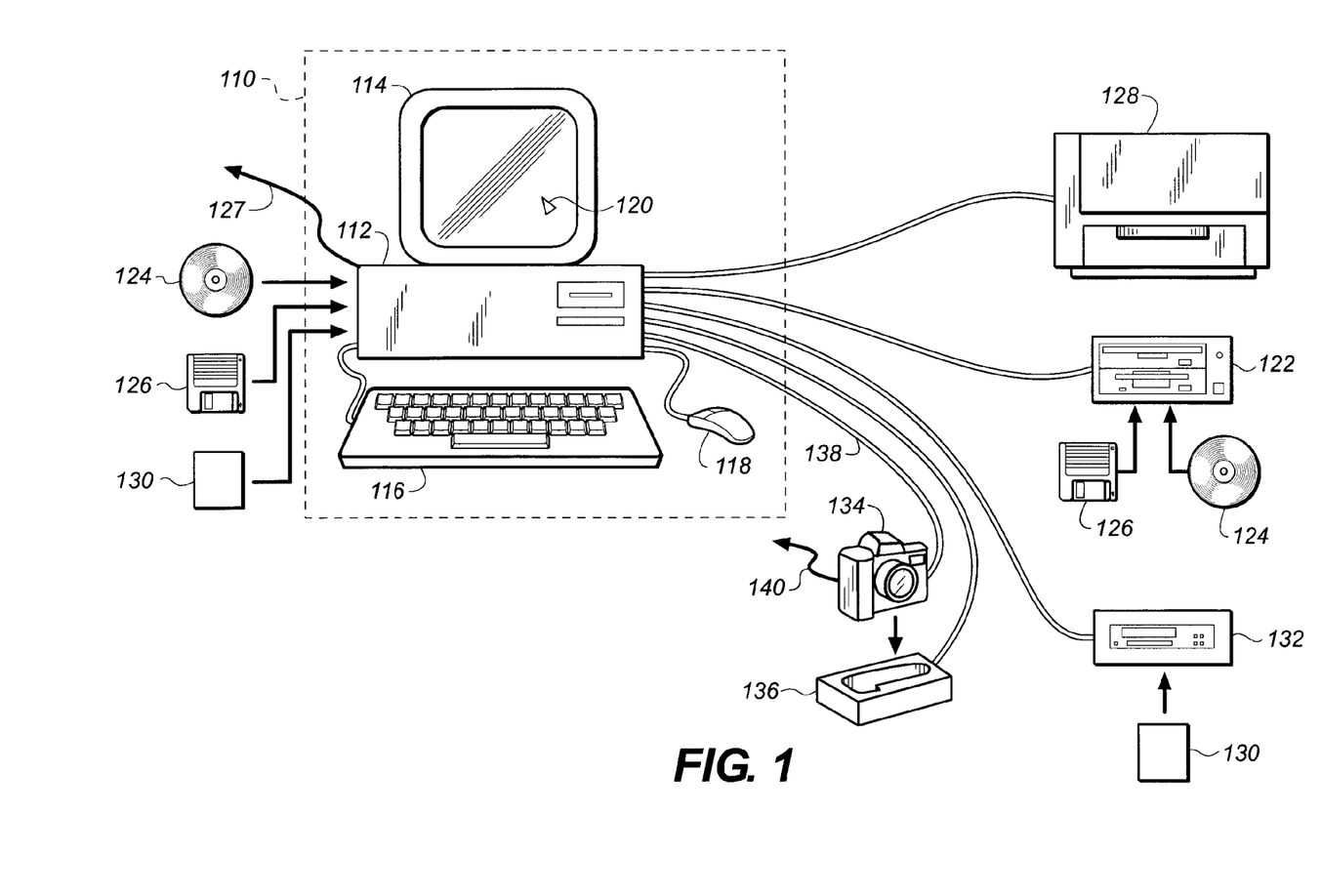
FIG. 1 is a perspective diagram of a computer system for implementing the present invention.

Referring to FIG. 1, there is illustrated a computer system 110 for implementing the present invention. Although the computer system 110 is shown for the purpose of illustrating a preferred embodiment, the present invention is not limited to the computer system 110 shown, but may be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor-based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 124, which typically includes software programs, is inserted into the microprocessor-based unit 112 for providing a means of inputting the software programs and other information to the microprocessor-based unit 112. In addition, a floppy disk 126 may also include a software program, and is inserted into the microprocessor-based unit 112 for inputting the software program. The compact disk-read only memory (CD-ROM) 124 or the floppy disk 126 may alternatively be inserted into externally located disk drive unit 122 that is connected to the microprocessor-based unit 112. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 may also be connected to the microprocessor-based unit 112 for printing a hardcopy of the output from the computer system 110.

Images may also be displayed on the display 114 via a personal computer card (PC card) 130, such as, as it was formerly known, a PCMCIA card (based on the specifications of the Personal Computer Memory Card International Association) that contains digitized images electronically embodied in the card 130. The PC card 130 is ultimately inserted into the microprocessor-based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera (not shown) or a scanner (not shown). Images may also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

Figure 2A:
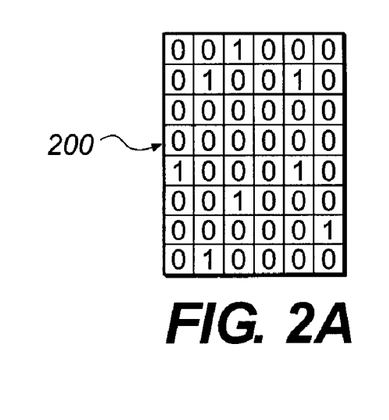
FIG. 2 is a diagram illustrating the hidden message template generation process.
Figure 2B:
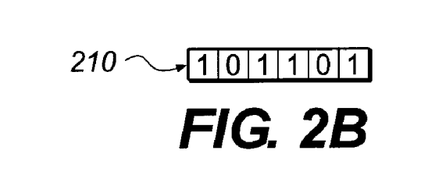
Figure 2C:
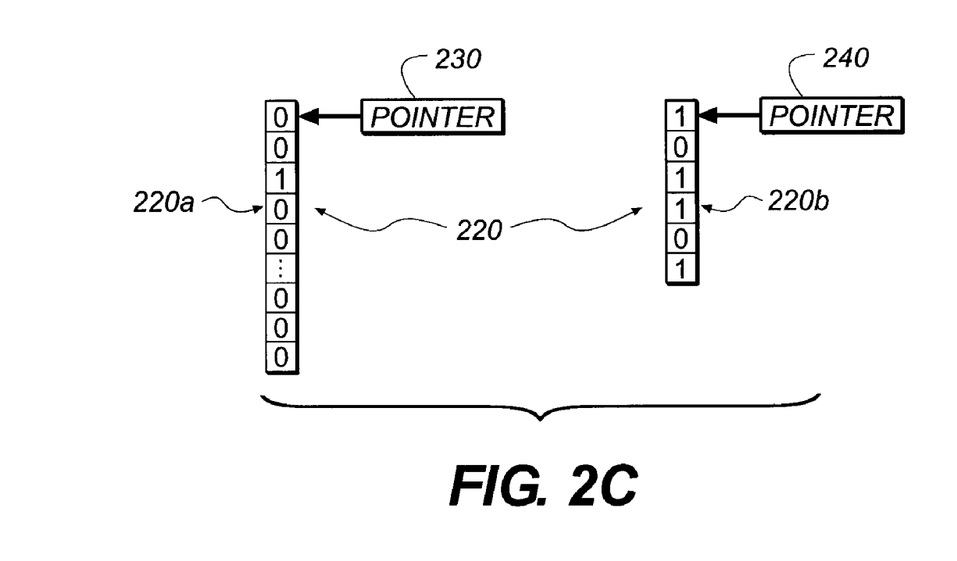

Referring to FIG. 2, a description of the message template 200 is provided. The message template 200 is a rectangular array of pixels, though in normal practice the array is preferably a square. Each element of the array is either a one or a zero. If the element is a one, then the element will carry a single bit of the hidden message 210. In order to attach the hidden message 210 to the message template 200 it is convenient to consider the message template 200 as a linear stream, which is readily accomplished by considering each row of the message template in succession, in what is commonly referred to as raster format. The hidden message 210 is also a linear stream. The number of bits in the hidden message is at most the number of elements in the template being set to one. The message template stream 200 and the hidden message 210 can be considered to be stacks 220 each respectively with a pointer 230 and 240. The process is outlined as a flowchart in FIG. 3.

Figure 3:
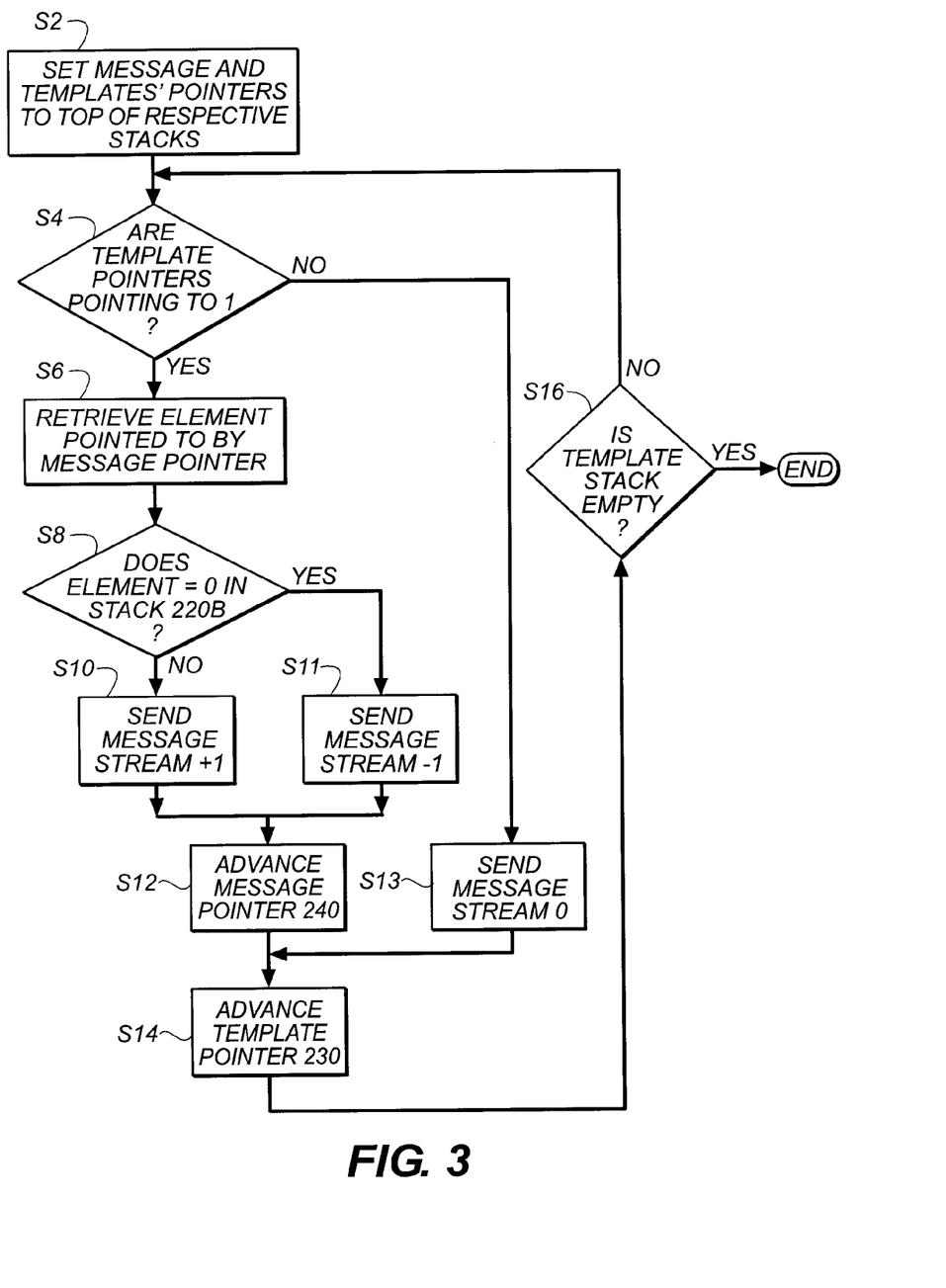
FIG. 3 is a logic flowchart of the hidden message template generation process.

Referring to FIGS. 2 and 3, the process begins S2 with both pointers 230 and 240 positioned to the top of their respective stacks 200. If the pointer to the message template stack 220*a* points to an element with a one S4, then the pointer 240 to the hidden stack message 220*b* points S6 to the next element to be included in the hidden message within the digital image. If the hidden message pointer 240 points to a value of one S8, then the hidden message template stream 220*a* is given S10 a value of +1, otherwise the hidden message template stream is given S11 a value of −1. Subsequently, the hidden message pointer 240 is advanced S12 to the next element of the stack 220b.

If the pointer 240 to the message template stack 220b is zero S4, then the hidden message stream pointer 240 is not addressed. In this case, the hidden message template stream is given S13 a value of 0. The message template pointer 230 is then advanced S14 to the next element in the stack 220a. The hidden template generation process continues until the message template pointer 230 reaches S16 the end of the stack 220a.

Figure 4A:
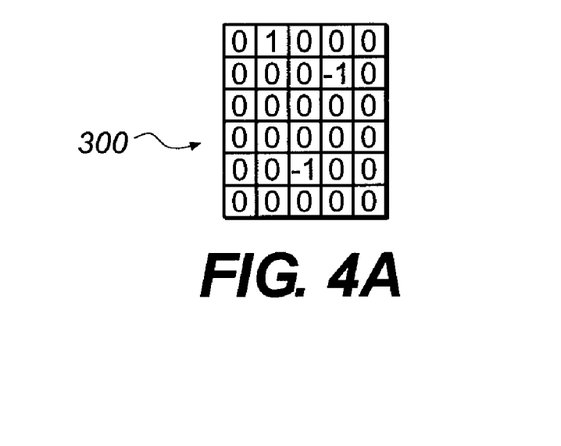
FIG. 4 is a diagram illustrating tiling of the hidden message across the image.
Figure 4B:
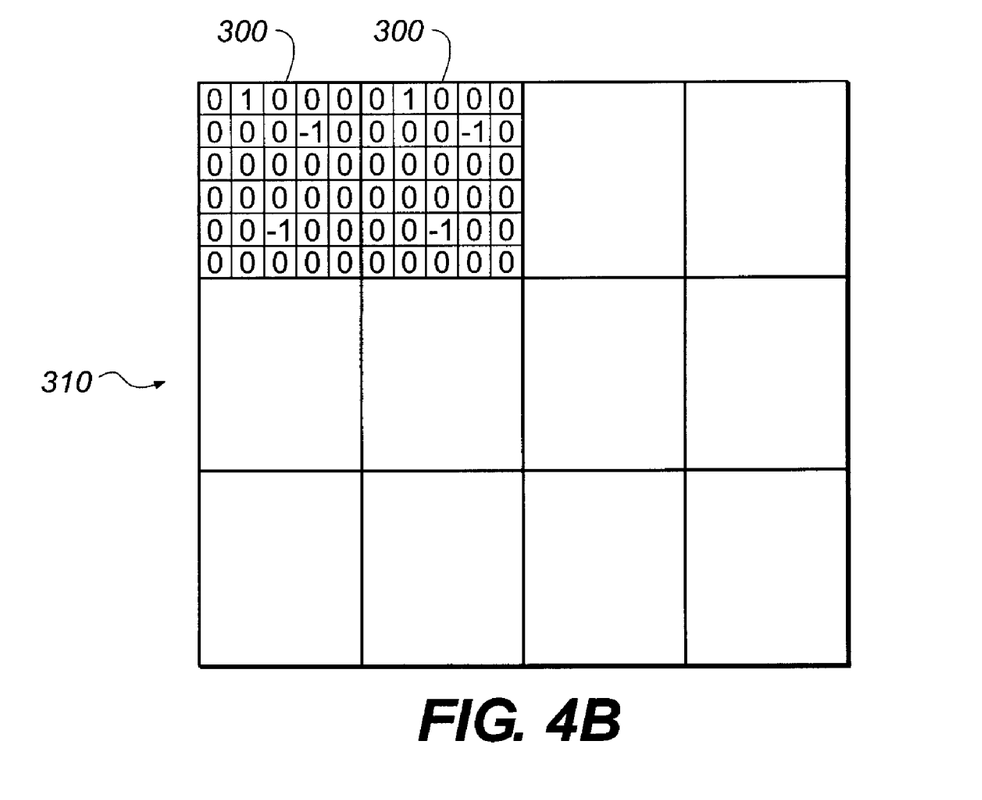

Referring to FIG. 4, the hidden message template 300 generated hereinabove is applied to a digital image by tiling the hidden message template 300 across the image 310 and adding the hidden message template 300 to the pixel values of the image 310. The hidden message template 300 can be seen to repeat both horizontally and vertically. For this reason it is customary to consider the hidden message template as a torus and distances between pixels in the hidden message template 300 are toroidal distances. For instance, if the message template is an array of n×m elements and if the toroidal distance between elements $(i_1, j_1)$ and $(i_2, j_2)$ is given by $$Tor((i_1, j_1), (i_2, j_2)) = \sqrt{v_n(i_1, i_2)^2 + v_m(j_1, j_2)^2},$$

$$\text{where } v_n(a, b) = \begin{cases} |a-b| & \text{if } |a-b| < \frac{n}{2} \\ n - |a-b| & \text{if } |a-b| \geq \frac{n}{2} \end{cases}$$

Figure 5:
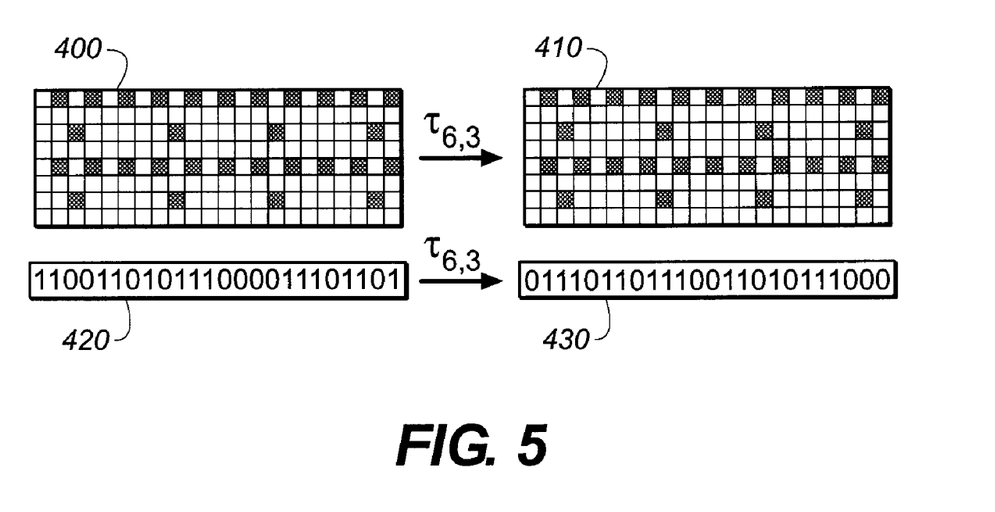
FIG. 5 is a diagram illustrating the impact of a replicating shift.

Before referring to FIG. 5, it is instructive to note that the hidden message template and hidden message will be shown in a different format with a different numeral for clarity. Referring now to FIG. 5, since the method does not contain an explicit calibration signal, it must be inferred from the hidden message template 300 illustrated in another form as hidden message template 400 in FIG. 5. A (δx, δy) shift is a mapping of the message template 400 to another template 410 of the form $$\tau_{(\delta x, \delta y)}(i,j) = ((i+\delta x) \bmod n, (j+\delta y) \bmod m)$$

If after a (δx, δy) shift the resulting template 410 is identical to the original hidden message template 400, then the hidden message template 400 is undesirable and is referred to in the following as a replicating shift. This is because the inferred calibration might determine the shifted version and the original hidden message 420 will be convoluted into a hidden message 430. Thus, it is preferred that any message template 300 should be free of shifts that map the template identically upon itself. Another property that is desirable is that the location of set of non-zero elements of the message template be separated as widely from each other as possible.

An optimal message template has a pattern of ones and zeroes where the ones are widely dispersed, but the alignment is free of replicating shifts within the message template. In order to determine an optimal message template it is necessary to determine a measure of the goodness of the message template. A measure that is appropriate is one that combines both the requirement to disperse to ones within the template and the other is to reward patterns that are resistant to replicating shifts. Consider a message template T as a collection of k locations within the n×m array, e.g., $$T = \{\rho_i | \rho_i = (\alpha_i, \beta_i), 0 \leq \alpha_i < n, 0 \leq \beta_i < m, 1 \leq i \leq k\}.$$

A measure of the how well the message template disperses the hidden message, the spatial dispersion measure, is given by:

$$Disp(T) = \sum_{i=1}^{k} \min(Tor(\rho_i, \rho_j), 1 \leq j \leq k, j \neq i)$$

It is well known that the Fourier transform of a shifted signal has the same power spectrum, but the signal has a phase shift. If a message template is replicated by shift operator then the phase terms of each frequency term of the template in the Fourier domain is a multiple of 2π, hence, if the number of unique phase terms in the frequency domain increase, the likelihood of such an event diminishes. Mathematically, the Fourier transform of the template is a discrete set of points in the complex plane. If we consider those points in polar format, the set is $P = \{r_j \exp(i\theta_j) | j = 0, 1, 2, \ldots, n\}$. Let γ be a threshold value $A = \{\theta_j | \exists p\epsilon \text{ such that } p = r_j \exp(i\theta_j) \text{ and } r_j \geq \gamma\}$. It should be noted that the elements of A are unique, meaning that if two points of the templates Fourier transform have the same phase angle, then the phase angle is included in set A at most once. The second measure is the number of unique phase terms in the frequency domain, or equivalently the cardinality of the set A. In practice, the measure uses the log 2 of the number of unique phase terms, as this provides a measure of dispersion of the template in the frequency domain. Thus the second measure is:

$$FDisp(T) = \log_2(|A|)$$

This is somewhat analogous to the notion of information-theoretic entropy.

The overall performance measure is the product of these two measures. This is given by:

$$\Omega(T) = Disp(T) \times FDisp(T)$$

A simulated annealing algorithm described in more detail below will seek to maximize this measure Ω(T).

The simulated annealing algorithm is a direct implementation of the basic algorithm. An initial message template is randomly selected. This template has the prescribed size with the prescribed number of one and zero elements. The arrangement of the template, referred to as the configuration, will be modified during the simulated annealing algorithm, in order to arrive at an optimal configuration. There are two configurations of interest, the current configuration and the alternative configuration. The current configuration is the template that the algorithm maintains as the preferred template. The performance of this template is measured and used as a baseline for an alternative configuration. The algorithm also maintains a third template, referred to as the best template, and this template is the template that has the best performance of all templates evaluated by the algorithm. A simulated annealing algorithm operates by randomly selecting alternative configurations, measuring the performance of the configuration and comparing the configuration's performance to the current configuration performance. If the performance of the alternative algorithm exceeds some threshold then the alternative configuration replaces the current configuration as well as the performance of the alternative algorithm replaces the current performance measure. The threshold in a simulated annealing algorithm allows for alternative configurations to be accepted, though their respective performance is inferior to the current configuration. This is done by variable referred to as the temperature. Initially the algorithm assumes a hot temperature, so the threshold is reduced accordingly. During each temperature level a series of possible alternative message templates are examined and measured. If the new message pattern meets a level of acceptance it replaces the current pattern, and if the new pattern does not met the level of acceptance it is rejected. The level of acceptance is based upon the temperature and the performance measure of the current message template. In the limit the system only accepts new configurations if the performance exceeds the current configuration performance. The performance measure described above is used for this purpose and the alternative configurations are generated by selecting one of the 1 values of the template, replacing it with a zero and finding a location within the template holding a 0 value and replacing the 0 with a 1. The placement is constrained in the locations also need to be sufficiently isolated form other locations with a 1 value. As the algorithm proceeds, the current configuration is also compared to the best template and if the performance of the current template exceeds the best template, the current template is then saved as the best template.

Upon completing the algorithm, the best template is stored to a computer file and is subsequently used an input to the data hiding process The invention has been described with reference to a preferred embodiment. However, it will be appreciated that variations and modifications can be effected by a person of ordinary skill in the art without departing from the scope of the invention.

PARTS LIST

110 Computer System
112 Microprocessor-based Unit
114 Display
116 Keyboard
118 Mouse
120 Selector on Display
122 Externally Located Disk Drive Unit
124 Compact Disk—read Only Memory (CD-ROM)
126 Floppy Disk
127 Network Connection
128 Printer
130 Personal Computer Card (PC card)
132 Externally Located PC Card Reader
134 Digital Camera
136 Camera Docking Port
138 Cable Connection
140 Wireless Connection
200 message template steam
210 hidden message
220 stacks
230 pointer
240 pointer
300 hidden message template
310 image
400 illustrative hidden message template
410 shifted hidden message template
420 hidden message
430 convoluted hidden message

What is claimed is:

1. A method for creating a message template used for embedding hidden messages, the method comprising the steps of:
   (a) determining a message template performance metric;
   (b) determining a message template geometric configuration comprising:
      (i) determining a message template capacity;
      (ii) determining a message template area; and
   (c) developing a numerical optimization algorithm containing the message template performance metric as a basis for optimization comprising:
      (i) initializing a current configuration that is randomly selected; and
      (ii) applying simulated annealing to the current configuration.

2. The method as a claim 1, wherein step (a) includes providing a spatial domain component as a requirement to disperse ones within the message template and providing the frequency domain component as a requirement as to eliminate replicating shifts.

3. The method as in claim 1 further comprising the step of storing the optimal message template.

4. The method as in claim 1 further comprising using $$Disp(T) = \sum_{i=1}^{k} \min(Tor(\rho_i, \rho_j), 1 \leq j \leq k, j \neq i)$$

as a spatial domain component.

5. The method as in claim 1 further comprising the step of using $$F\text{Disp}(T) = \log_2(|A|)$$

as a frequency domain component.

* * * * *

UNITED STATES PATENT AND TRADEMARK OFFICE
CERTIFICATE OF CORRECTION

PATENT NO. : 7,330,561 B2 Page 1 of 1
APPLICATION NO. : 10/717291
DATED : February 12, 2008
INVENTOR(S) : Lawrence A. Ray It is certified that error appears in the above-identified patent and that said Letters Patent is hereby corrected as shown below:

Column 8, Claim 2, line 1 Delete "a" and substitute --in--.

Signed and Sealed this

Seventeenth Day of June, 2008

JON W. DUDAS
*Director of the United States Patent and Trademark Office*

UNITED STATES PATENT AND TRADEMARK OFFICE
CERTIFICATE OF CORRECTION

PATENT NO. : 7,330,561 B2  Page 1 of 1
APPLICATION NO. : 10/717291
DATED : February 12, 2008
INVENTOR(S) : Lawrence A. Ray It is certified that error appears in the above-identified patent and that said Letters Patent is hereby corrected as shown below:

Column 8, Claim 2, line 29      Delete "a" and substitute --in--.

This certificate supersedes the Certificate of Correction issued June 17, 2008.

Signed and Sealed this

Twenty-second Day of July, 2008

JON W. DUDAS
*Director of the United States Patent and Trademark Office*